(12) United States Patent
Liu (10) Patent No.: US 11,691,180 B2
(45) Date of Patent: Jul. 4, 2023

(54) SORTING SYSTEM AND METHOD (71) Applicant: BEIJING GEEKPLUS TECHNOLOGY CO., LTD., Beijing (CN)

(72) Inventor: Kai Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/636,029

(22) PCT Filed: Mar. 16, 2020

(86) PCT No.: PCT/CN2020/079529
§ 371 (c)(1),
(2) Date: Feb. 17, 2022

(87) PCT Pub. No.: WO2021/031556
PCT Pub. Date: Feb. 25, 2021

(65) Prior Publication Data
US 2022/0280978 A1 Sep. 8, 2022

(30) Foreign Application Priority Data
Aug. 19, 2019 (CN) .......................... 201910766018.5

(51) Int. Cl.
*G06F 7/00* (2006.01)
*B07C 3/00* (2006.01)
(Continued)

(52) U.S. Cl.
CPC ............ *B07C 3/006* (2013.01); *B65G 1/0492* (2013.01); *G05B 19/4155* (2013.01);
(Continued)

(58) Field of Classification Search
CPC .. B07C 3/006; B65G 1/0492; G05B 19/4155; G05B 2219/45047; G05B 2219/50391; G06Q 10/087
(Continued)

(56) References Cited

U.S. PATENT DOCUMENTS 8,594,834 B1 * 11/2013 Clark .................. G06Q 10/087
700/214
10,301,121 B1 5/2019 Hoffman et al.
(Continued)

FOREIGN PATENT DOCUMENTS

CN 206343389 U 7/2017
CN 107918802 A 4/2018
(Continued)

OTHER PUBLICATIONS

Zhou Huande, et al., Several problems to be considered in optimizing the letter sorting process of man-machine combination, China Post, 1996, pp. 10-12, Issue 9.

*Primary Examiner* — Yolanda R Cumbess
(74) *Attorney, Agent, or Firm* — Bayramoglu Law Offices LLC (57) ABSTRACT

A sorting system includes a control server, multiple sorting robots, and a sorting region. The sorting region is divided into multiple sub-regions. At least one supply station and multiple delivery openings are deployed in each sub-region. Delivery openings respectively correspond to paths. The control server determines, according to path information of an item to be sorted, a target delivery opening corresponding to a path of the item, determines, from the multiple sub-regions of the sorting region, a target sub-region in which the target delivery opening is located, and allocates a delivery task to a target sorting robot among the multiple sorting robots. In response to the delivery task, the target sorting robot acquires the item from the supply station where the item is located, carries the item to the target delivery opening in the target sub-region, and delivers the same.

17 Claims, 5 Drawing Sheets

(51) Int. Cl.
*B65G 1/04* (2006.01)
*G05B 19/4155* (2006.01)
*G06Q 10/087* (2023.01)

(52) U.S. Cl.
CPC . *G06Q 10/087* (2013.01); *G05B 2219/45047* (2013.01); *G05B 2219/50391* (2013.01)

(58) Field of Classification Search
USPC .................................. 700/213, 215, 223, 228
See application file for complete search history.

(56) References Cited

U.S. PATENT DOCUMENTS

| | | | | |
|---|---|---|---|---|
| 2016/0145044 A1* | 5/2016 | Mountz | ................ | B65G 1/1373 |
| | | | | 700/216 |
| 2017/0313516 A1* | 11/2017 | Kazama | ................ | G06Q 10/04 |
| 2019/0233213 A1* | 8/2019 | Phan-Quiroga | ...... | B65G 1/0492 |
| 2019/0367278 A1* | 12/2019 | Bellar | .................... | G06Q 10/08 |

FOREIGN PATENT DOCUMENTS

| | | | |
|---|---|---|---|
| CN | 109351643 | A | 2/2019 |
| CN | 109759337 | A | 5/2019 |
| CN | 109985815 | A * | 7/2019 |
| CN | 109985815 | A | 7/2019 |
| CN | 110404830 | A | 11/2019 |
| JP | H08113315 | A | 5/1996 |
| JP | 2000238906 | A | 9/2000 |
| JP | 2003192113 | A | 7/2003 |
| JP | 2013256371 | A | 12/2013 |
| JP | 2014040317 | A | 3/2014 |
| JP | 2017185430 | A | 10/2017 |
| WO | 2015032402 | A1 | 3/2015 |
| WO | 2016132534 | A1 | 8/2016 |
| WO | 2016147335 | A1 | 9/2016 |
| WO | 2018088899 | A1 | 5/2018 |

* cited by examiner

SORTING SYSTEM AND METHOD

CROSS REFERENCE TO THE RELATED APPLICATIONS

The present application is a national phase entry under 35 U.S.C. § 371 of International Application No. PCT/CN2020/079529, filed on Mar. 16, 2020, which claims the priority from Chinese Patent Application No. 201910766018.5 filed with the China National Intellectual Property Administration on Aug. 19, 2019, which is hereby incorporated by reference in its entirety.

TECHNICAL FIELD

Embodiments of the present application relate to the field of logistics and warehousing technology, for example, to a sorting system and method.

BACKGROUND

With the rapid development of the warehousing and logistics industry, the automation technology is gradually introduced to multiple aspects (such as parcel sorting) in the warehousing and logistics industry, so as to realize the intelligent and automated operations of multiple aspects.

In the sorting process, the number of items to be sorted is very large, and as the area of the sorting area gradually increases, different items to be sorted need to be delivered to different locations for temporary storage. If a delivery error occurs or the delivery location is inaccurate during delivery, it will cause the classification error of the items to be sorted, resulting in deviations in the subsequent delivery, and the subsequent secondary sorting may be required, thereby greatly reducing the sorting efficiency of the robot.

SUMMARY

Embodiments of the present application provide a sorting system and method, so as to improve the sorting and delivery efficiency of items to be sorted.

Embodiments of the present application provide a sorting system including: a control server, a plurality of sorting robots and a sorting area; the sorting area is divided into a plurality of sub-areas, each sub-area is deployed with at least one supply station and a plurality of delivery openings, and one delivery opening corresponds to one destination; wherein:

the control server is configured to determine a target delivery opening corresponding to a destination of an item to be sorted according to destination information of the item to be sorted, and determine a target sub-area where the target delivery opening is located among the plurality of sub-areas of the sorting area; and assign a delivery task to a target sorting robot among the plurality of sorting robots;

the target sorting robot is configured to, in response to the delivery task, retrieve the item to be sorted from a supply station where the item to be sorted is located, and transport the item to be sorted to the target delivery opening in the target sub-area for delivery.

Embodiments of the present application further provide a sorting method, which includes:

a control server determining a target delivery opening corresponding to a destination of an item to be sorted according to destination information of the item to be sorted, and determining a target sub-area where the target delivery opening is located among a plurality of sub-areas of a sorting area; and assigning a delivery task to a target sorting robot among a plurality of sorting robots; wherein the sorting area is divided into a plurality of sub-areas, each sub-area is deployed with at least one supply station and a plurality of delivery openings, and one delivery opening corresponds to one destination;

the target sorting robot, in response to the delivery task, retrieving the item to be sorted from a supply station where the item to be sorted is located, and transporting the item to be sorted to the target delivery opening in the target sub-area for delivery.

BRIEF DESCRIPTION OF THE DRAWINGS

Throughout the drawings, the same reference symbols are used to represent the same elements. In the accompanying drawings.

DETAILED DESCRIPTION OF THE EMBODIMENTS

The present application will be described below with reference to the drawings and embodiments. It can be understood that the specific embodiments described here are only used to explain the present application, but not to limit the present application. In addition, it should be noted that, for ease of description, the drawings only show a part of the structures related to the present application instead of all the structures.

The overall sorting process of items to be sorted (e.g., goods or parcels to be sorted) of the embodiments will be briefly introduced below. The overall sorting process includes: parcel supply process, delivery process, and package collection process. In the embodiments, by the parcel supply process, the items to be sorted are allocated from the transport devices to the supply stations; by the delivery process, the items to be sorted on the supply stations are delivered to the collection containers deployed in the sorting area; and by the package collection process, the collection containers containing the items to be sorted are transported to the collection stations. The sorting process of the items to be sorted can be completed through the three links described above.

In the following, the sorting system and sorting method provided in embodiments of the present application will be described through the following embodiments and alternative solutions.

Figure 1:
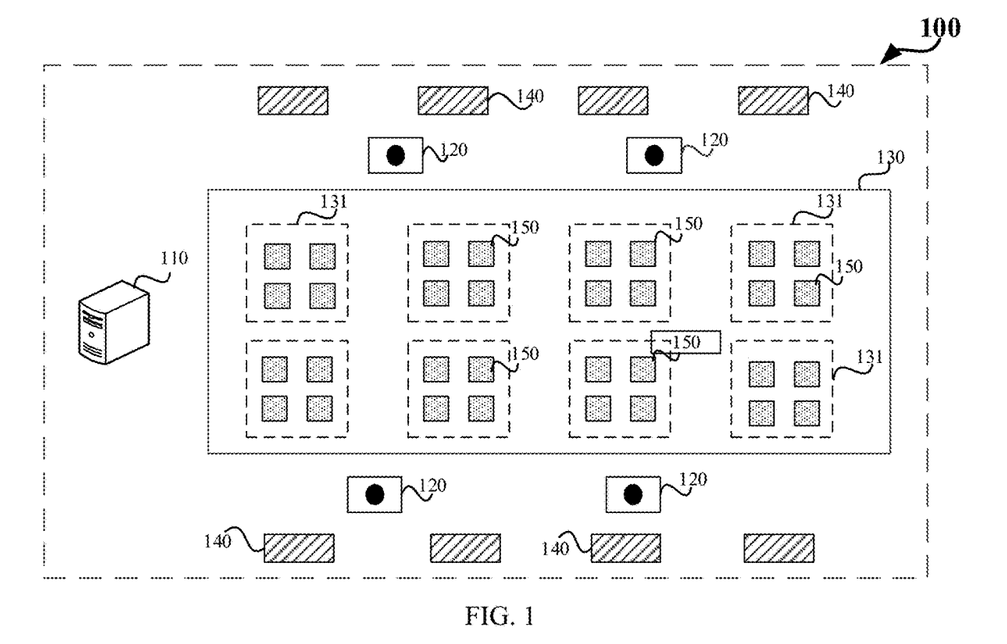
FIG. 1 is a structural schematic diagram of a sorting system provided in embodiments of the present application.

FIG. 1 is a structural schematic diagram of a sorting system provided in embodiments of the present application. The technical solution of the embodiments can be applied to the sorting and delivery process in the sorting scenario. This system can implement the sorting method provided in any embodiment of the present application. As shown in FIG. 1, the sorting system 100 provided in the embodiments of the present application includes: a control server 110, a plurality of sorting robots 120 and a sorting area 130. The sorting area 130 is divided into a plurality of sub-areas 131, each sub-area 131 is provided with at least one supply station 140 and a plurality of delivery openings 150. One delivery opening 150 corresponds to one destination. In the embodiments, the control server 110 is configured to determine a target delivery opening 150 corresponding to the destination of an item to be sorted according to the destination information of the item to be sorted, determine a target sub-area 131 where the target delivery opening 150 is located among the plurality of sub-areas 131 of the sorting area 130, and assign a delivery task to a target sorting robot 120 among the plurality of sorting robots 120. The target sorting robot 120 is configured to, in response to the delivery task, retrieve the item to be sorted from a supply station 140 where the item to be sorted is located, and carry the item to be sorted to the target delivery opening 150 in the target sub-area 131 for delivery.

In the embodiments, the sorting scheme of the present application can apply to the delivery process of the items to be sorted in the floor-type sorting scenario or the steel platform sorting scenario. In the floor-type sorting scenario, the sorting robot 120 runs on the ground, and the aforementioned delivery opening 150 is the opening of a collection container (for example, a roll container) on the ground. In the steel platform sorting scenario, the sorting robot 120 runs on a steel platform structure, and the aforementioned delivery opening 150 is an opening arranged on the steel platform.

In the embodiments, referring to FIG. 1, the control server 110 may establish a communication connection with the sorting robot 120 to control and schedule the sorting robot 120 in the sorting system. The control server 110 refers to a software and/or hardware system with data information storage and data information processing capabilities, and can communicate with the sorting robot 120 and other hardware devices or software systems in the sorting system in a wired or wireless manner. The control server 110 can issue control commands to various types of robots in the sorting system and send tasks to other hardware devices or software systems, count the sorting states of the items to be sorted, detect the working status of the sorting system, and transfer the information to the staff.

Figure 2:
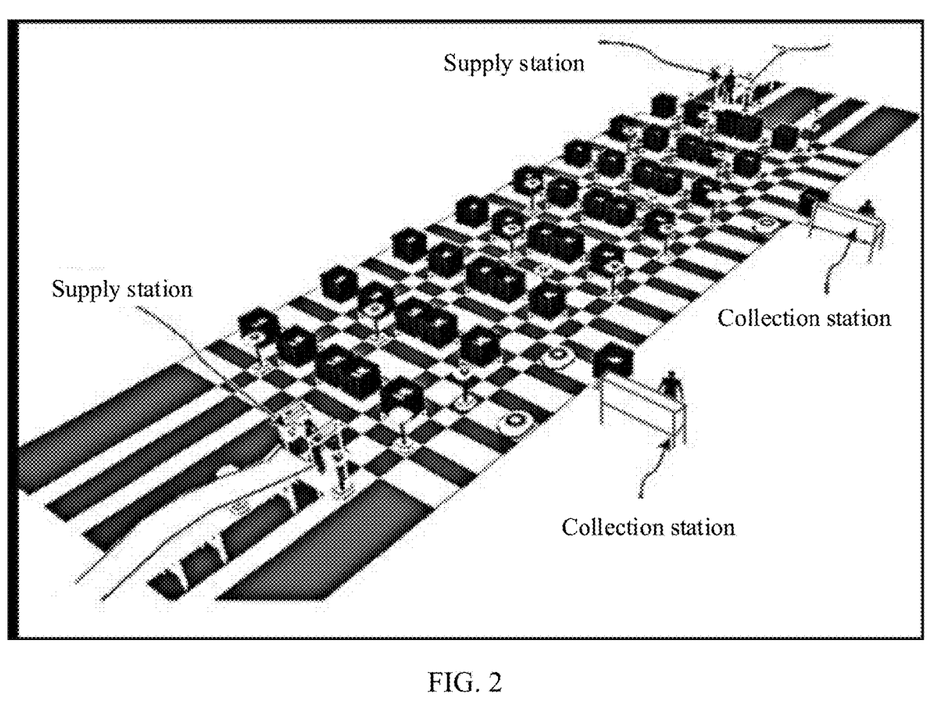
FIG. 2 is a schematic diagram of a relatively small sorting area provided in embodiments of the present application.

In the embodiments, the sorting area refers to a site area that is artificially determined for sorting operations in the warehouse logistics industry. The sorting area is either large or small. That is, some sorting areas cover relatively large floor space, while some sorting areas cover relatively small floor space. FIG. 2 is a schematic diagram of a sorting area with relatively small floor space provided in embodiments of the present application. Refer to FIG. 2, the sorting area with relatively small floor space shown in FIG. 2 contains only two supply stations and two collection stations. Since the sorting area has the relatively small floor space, the delivery path when the items to be sorted are sorted and delivered is accordingly relatively small. The supply stations apply to the entire sorting area, that is, the items to be sorted taken from the supply stations can be delivered arbitrarily in the sorting area without area limitation. Meanwhile, due to the relatively small area of the sorting area, there is no defect of increasing the delivery distance greatly.

Figure 3:
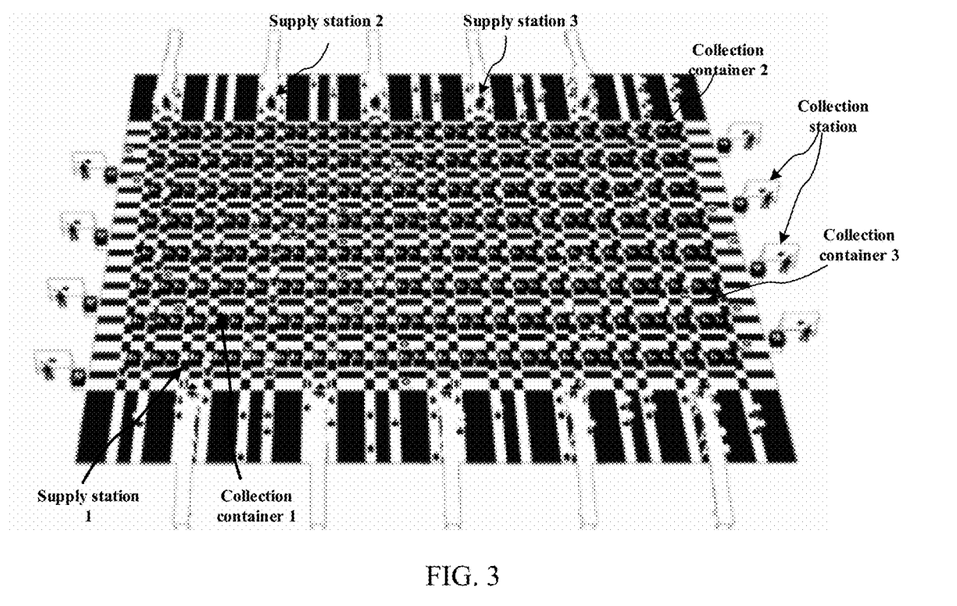
FIG. 3 is a schematic diagram of a relatively large sorting area after expansion provided in embodiments of the present application.

However, in actual application scenarios, as the number of items to be sorted continues to increase, there are more and more sorting destinations. And, as the floor space of the sorting area becomes very large, the delivery routing of the items to be sorted is also getting more and more complicated. FIG. 3 is a schematic diagram of an expanded sorting area with relatively large floor space provided in embodiments of the present application. Referring to FIG. 3, when the items to be sorted are sorted and delivered in the sorting area, the sorting route is complicated and the area of the sorting area is very large. When the item to be sorted taken from the supply station 1 in the lower left corner of FIG. 3 is delivered from the delivery opening corresponding to the collection container 1 in the lower left corner, the resulting delivery distance is relatively small, and this delivery distance will not affect the delivery efficiency. However, if the item to be sorted taken from the supply station 1 in the lower left corner of FIG. 3 is delivered from the delivery opening corresponding to the collection container 2 in the upper right corner, this will undoubtedly greatly increase the delivery distance of the item to be sorted, leading to the very low delivery efficiency of the item to be sorted.

In view of the foregoing defect, referring to FIG. 1, the sorting area 130 in the sorting system can be logically divided into a plurality of sub-areas 131 in advance. For each sub-area 131 in the sorting area 130, each sub-area 131 is correspondingly deployed with one or more supply stations 140. Each sub-area 131 is correspondingly deployed with a plurality of delivery openings 150, so that it can be ensured that the items to be sorted obtained from the supply stations 140 are only allowed to be delivered from the delivery openings 150 in the corresponding deployed sub-area 131 and not allowed to be delivered from the delivery openings 150 in other sub-areas 131. The sorting and delivery operations of the items to be sorted retrieved from different supply stations can be performed at the delivery openings of their respective sub-areas without interfering with each other, reducing the operations of delivering the items to be sorted across sub-areas as possible, and thus avoiding the great increase of the delivery distance of the items to be sorted during sorting and delivery as possible.

Exemplarily, when the sorting area 130 is divided, it can be divided into a plurality of sub-areas in accordance with geographical areas where the cities indicated by the destinations are located, to allow each sub-area to correspond to a geographical area. For example, the above-mentioned geographical areas can include "North China", "East China", "Central China", "South China" and "Northwest China", etc. Furthermore, the delivery openings deployed in each sub-area can be divided according to information of the cities included in each geographical area, to ensure that each delivery opening corresponds to one destination, that is, each delivery opening corresponds to one city.

The working process of the sorting system in the embodiments will be described below in conjunction with the structural schematic diagram of the sorting system shown in FIG. 1.

In the embodiments, optionally, for each sub-area 131 in the sorting area 130, one delivery opening 150 corresponds to only one destination, ensuring that only the items to be sorted for the corresponding destination of the delivery opening 150 are allowed to be delivered from the delivery opening 150. The items to be sorted in other destinations are not allowed to be delivered from the delivery opening 150. In the embodiments, one delivery opening 150 here corresponds to only one destination, which does not mean that there is only one delivery opening 150 for the destination, but one delivery opening 150 corresponds to only one destination, and one destination can be associated with a plurality of delivery openings 150. That is, the items to be sorted for a certain destination are allowed to be delivered from any one of a plurality of delivery openings 150 associated with this destination.

In the embodiments, the destination information of the item to be sorted includes the information of the city where the receiving address of the item to be sorted is located, that is, the information of the city to be delivered. Referring to FIG. 1, the control server 110 may determine the target delivery opening corresponding to the destination of an item to be sorted according to the destination information of the item to be sorted. At the same time, the sub-area 131 where the target delivery opening is located can be determined according to the foregoing division result of the sorting area 130 and the delivery opening 150 corresponding to each sub-area 131, and the sub-area 131 where the target delivery opening 150 is located is taken as the target sub-area. In the above way, it can be determined that the item to be sorted needs to be assigned to the target delivery opening of the target sub-area of the sorting area for sorting and delivery, so as to ensure that the item to be sorted can be delivered orderly according to the destination subsequently.

For example, taking the city where the receiving address, indicated by the destination information of the item to be sorted such as Tianjin, the control server 110 may determine that the destination in the sorting area is the delivery opening representing "Tianjin" according to the destination information of the item to be sorted. The delivery opening corresponding to this destination can be taken as the target delivery opening at this time. Since Tianjin belongs to the North China, it is determined that the sub-area where the target delivery opening is located is the sub-area corresponding to the "North China". While, the sub-area corresponding to the "North China" can be taken as the target sub-area, so as to subsequently perform the item sorting and delivery operation on the item to be sorted from the target delivery opening of the target sub-area.

In an optional mode of the embodiments, the control server 110 stores the delivery opening configuration information of a plurality of destinations, and each destination in the delivery opening configuration information is associated with at least one delivery opening 150. The control server 110 may match the destination indicated by the destination information of the item to be sorted with the pre-stored delivery opening configuration information of the plurality of destinations, and determine the target delivery opening corresponding to the destination of the item to be sorted among the plurality of delivery openings 150 according to the matching result.

In the embodiments, when the sorting area 130 is divided into a plurality of sub-areas 131 and setting the association relationship between different destinations and delivery openings 150 in the plurality of sub-areas 131 is completed, to ensure that each destination is associated with at least one delivery opening 150, the control server 110 may store the association relationship between destinations and delivery openings 150 in the delivery opening configuration information. It can be seen that the delivery opening configuration information indicates the configuration situation of the delivery openings corresponding to a plurality of destinations. That is, each destination is associated with one or more delivery openings 150 in the sorting area. The control server 110 can query the target delivery opening associated with the destination indicated by the destination information matching with the item to be sorted according to the association relationship between a plurality of destinations and a plurality of delivery openings 150 in the sorting area in the delivery opening configuration information. For example, if it is determined that the city represented by the destination indicated by the destination information of the item to be sorted is "Tianjin", then the delivery opening 150 associated with "Tianjin" is taken as the target delivery opening; and, since Tianjin is geographically located in North China, the delivery opening 150 associated with "Tianjin" is deployed in the sub-area 131 corresponding to the "North China". At this time, the sub-area 131 corresponding to the "North China" can be taken as the target sub-area.

In the embodiments, optionally, a delivery opening can only deliver the items to be sorted in one destination. During the sorting and delivery process, the number of items to be sorted in some destinations may be relatively small, that is, the number of items to be sorted for delivery from a certain delivery opening is relatively small. In order to save the delivery openings and ensure the reasonable use of the delivery openings, there is no need to arrange excessive delivery openings. As such, for such destination, this destination can be set to be associated with only one delivery opening. Optionally, in the sorting and delivery process, there are still some destinations in which the number of items to be sorted is relatively large, that is, the number of items to be sorted that are delivered from a certain delivery opening is relatively large. If the number of delivery openings used to deliver the items to be sorted in the destination is relatively small, the items to be sorted cannot be delivered well, so more delivery openings are needed to deliver the items to be sorted for the destination. At this time, for such destination, this destination can be set to be associated with a plurality of delivery openings of the sorting area. In view of the above situation, when querying and matching the delivery opening associated with the destination of the item to be sorted according to the delivery opening configuration information, if it is determined that there is only one delivery opening associated with the destination of the item to be sorted from the plurality of delivery openings in the sorting area according to the matching result, the delivery opening is taken as the target delivery opening corresponding to the item to be sorted; if it is determined that there are at least two delivery openings associated with the destination of the item to be sorted, then the delivery opening with the closest distance to the item to be sorted is selected from at least two delivery openings as the target delivery opening.

In an optional mode of the embodiments, for the a plurality of sub-areas 131 logically divided from the sorting area 130, the physical locations of destinations corresponding to the plurality of delivery openings 150 in at least one sub-area 131 are close. In one embodiment, the case that the physical locations of destinations corresponding to a plurality of delivery openings 150 in at least one sub-area 131 are close can be understood as: the distance between physical locations of destinations corresponding to any two of a plurality of delivery openings 150 in at least one sub-area 131 is less than a preset distance threshold. In an optional example, there is at least one sub-area 131 in the sorting area 130, and at least part of a plurality of delivery openings 150 in the sub-area 131 are allowed to be used only for sorting and delivering the items to be sorted in same or similar destinations. For example, when the city where the receiving address indicated by the destination information of an item to be sorted is located is Beijing and the city where the receiving address indicated by the destination information of another item to be sorted is located is Tianjin, since both Beijing and Tianjin belong to the North China, it can be seen that the destinations of the two items to be sorted are close in geography, and both located in the "North China". Therefore, the delivery openings 150 corresponding to the destinations for "Tianjin" and "Beijing" can be set in the same sub-area 131. At this time, two items to be sorted can be delivered to the same sub-area 131, and considering that one delivery opening 150 corresponds to one destination, the two items to be sorted can be delivered from different delivery openings 150 in the same sub-area 131.

In an optional mode of the embodiments, it is considered that there may be items to be sorted with the same destination at different supply stations 140. At this time, in order to avoid the increase in delivery distance caused by delivery across sub-areas, at least some of the delivery openings 150 among a plurality of sub-areas 131 can be set to correspond to the same destination among the plurality of sub-areas 131 logically divided from the sorting area 130. In this way, the items to be sorted with the same destination in different supply stations 140 can be delivered into the nearest delivery opening 150 of the sub-area 131 corresponding to respective supply stations 140, without the need to deliver across sub-areas, thereby avoiding the remote delivery and improving the delivery efficiency.

In the embodiments, referring to FIG. 1, there are a plurality of sorting robots 120 that are on standby or in the working state in the sorting area 130, and the control server 110 can issue a delivery task for the item to be delivered to one target sorting robot 120 among the plurality of sorting robots 120 located in the sorting area 130. At the same time, the item to be sorted is placed at the supply station 140, and the target sorting robot located in the sorting area 130 can receive and respond to the delivery task sent by the control server 110, retrieve the item to be sorted from the supply station 140 where the item to be sorted is located, and carry the item to be sorted to the target delivery opening in the target sub-area for delivery, and deliver the item to be sorted to the collection container corresponding to the target delivery opening through the target delivery opening.

In an optional mode of the embodiments, in the floor-type sorting scenario, the container opening of each collection container deployed in the sorting area can be used as a delivery opening; while in the steel platform sorting scenario, the grid opening on the steel platform structure can be used as a delivery opening, and a collection container is deployed corresponding to the delivery opening and below the steel platform. Optionally, when the target sorting robot receives the delivery task issued by the control server 110, the target sorting robot may also receive the destination for the item to be sorted planned according to the location of the target delivery opening sent by the control server 110. Then, the target sorting robot can travel to the target delivery opening of the target sub-area according to the aforementioned destination, and deliver the item to be sorted from the target delivery opening to the collection container corresponding to the target delivery opening, to complete the sorting and delivery operations of the item to be sorted. In the embodiments, for each delivery opening 150 in the sorting and delivery area 130, each delivery opening 150 corresponds to one collection container, and a plurality of collection containers are arranged in an array in the sorting area.

In the embodiments, the supply station 140 already contains one or more items to be sorted, waiting for the subsequent sorting and delivery operations. A reader for the destination information of the item to be sorted is also arranged at the supply station 140. The reader can scan and read the destination information of the item to be sorted, and send the destination information of the item to be sorted to the control server 110, to allow the control server 110 to determine the target delivery opening corresponding to the destination of the item to be sorted according to the destination information of the item to be sorted. Optionally, a sorting worker or sorting mechanical arm is provided at each supply station 140, and the sorting worker or sorting mechanical arm can place the item to be sorted on the sorting robot 120 at the supply station 140. Alternatively, the sorting robot 120 can directly grab the item to be sorted from the supply station 140. Optionally, the sorting worker or the sorting mechanical arm may be located in the left, right, and front of the supply station 140.

In an optional mode of the embodiments, a plurality of sub-areas 131 respectively correspond to different sorting robots 120 among the plurality of sorting robots 120, and each sub-area 131 corresponds to at least one sorting robot. Meanwhile, the control server 110 may select one target sorting robot from at least one sorting robot 120 corresponding to the target sub-area according to the target sub-area corresponding to the item to be sorted, and assign a delivery task for the item to be sorted to one target sorting robot corresponding to the target sub-area among the at least one sorting robot 120. In this way, it can be ensured that a plurality of sub-areas 131 of the sorting area 130 are all provided with at least one respective sorting robot 120, so that the sorting robot 120 of each sub-area 131 only delivers within its own sub-area 131, and does not deliver across sub-areas as possible.

According to a sorting scheme provided in embodiments of the present application, the sorting area can be divided into a plurality of sub-areas, each sub-area is provided with one or more supply stations, and a plurality of delivery openings. One delivery opening corresponds to one destination. On this basis, the control server can assign different delivery openings to the items to be sorted with different destinations according to the destination information of the items to be sorted, that is, the control server can determine the target delivery opening corresponding to the destination of the item to be sorted according to the destination information of the item to be sorted, and determine the target sub-area where the target delivery opening is located among the plurality of sub-areas. The sorting robot can deliver according to the determined target delivery opening to ensure that the items to be sorted in different destinations are only allowed to be delivered from the delivery openings in the sub-areas to which the items to be sorted belong. Further, since the floor space size of each sub-area is moderate, it can ensure that various items to be sorted are delivered according to the destinations during the delivery. The sorting area is divided into different sub-areas, each sub-area corresponds to the matching delivery opening and destination. As such, when the area of the sorting area needs to be expanded, adding a sub-area is only required to complete the expansion of the sorting area. Meanwhile, when the sub-area is added, another destination will be added, which can achieve the purpose of expanding the sorting and destination without reducing the sorting and delivery efficiency of other sub-areas. As can be seen, the sorting scheme of the present application can expand the size of the sorting area arbitrarily based on the demand, without excessively affecting the delivery process of other sorting and destinations, so that the expandability of the sorting system is strong.

Figure 4:
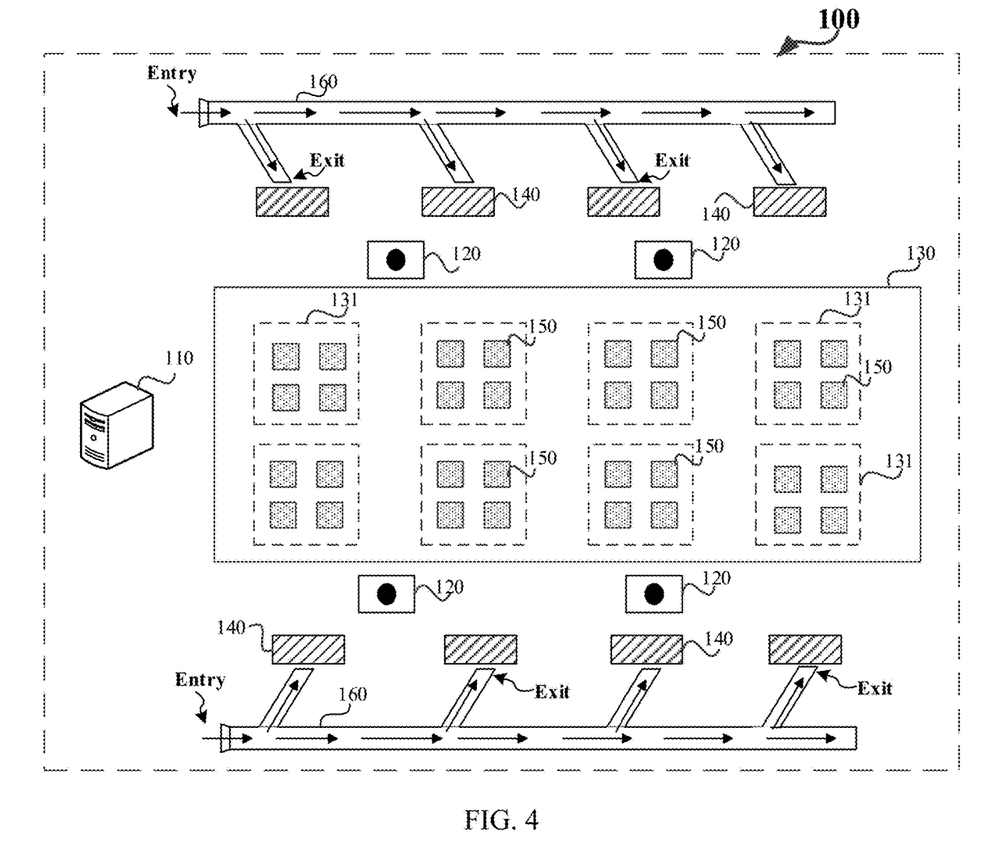
FIG. 4 is a structural schematic diagram of another sorting system provided in embodiments of the present application.

FIG. 4 is a structural schematic diagram of another sorting system provided in embodiments of the present application. The embodiments are described on the basis of the foregoing embodiments. The embodiments can be combined with multiple optional solutions in one or more of the foregoing embodiments. Referring to FIG. 4, the sorting system provided in the embodiments further includes a guiding device 160 on the basis of the sorting system of the foregoing embodiments. The guiding device 160 includes an entry, a plurality of exits, and a conveying component connecting the entry and the plurality of exits. The item to be sorted enters the guiding device 160 through the entry, and is conveyed through the conveying component, and exits from the guiding device 160 through one of the plurality of exits. There is a preset correspondence between the plurality of exits and the plurality of supply stations 140. The control server 110 is configured to send a guidance command of the item to be sorted to the guiding device 160 according to the target sub-area, and the guiding device is configured to guide the item to be sorted to a target exit corresponding to one supply station 140 in the target sub-area 131 according to the guidance command.

Figure 5:
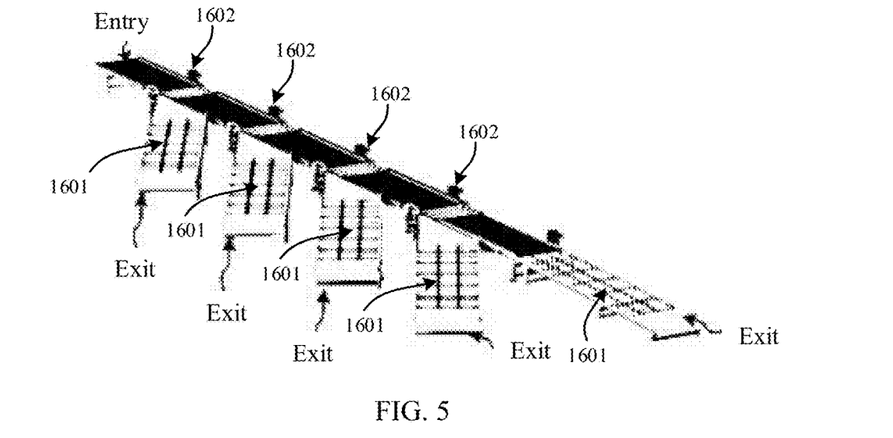
FIG. 5 is a schematic diagram of a partial structure of a guiding device provided in embodiments of the present application.

In the embodiments, FIG. 5 is a schematic diagram of a partial structure of a guiding device provided in embodiments of the present application. Referring to FIG. 5, the guiding device 160 is provided with an entry configured to receive the items to be sorted and a plurality of exits configured to output the items to be sorted, as well as a plurality of conveying components 1601 connecting the entry and the exits of the guiding device 160, where the conveying component 1601 may be a conveyor. For each exit of the guiding device 160, each exit may have a correspondence with one or more supply stations 140 corresponding to each sub-area 131 of the sorting area.

In the embodiments, the control server 110 can determine the target sub-area corresponding to the item to be sorted according to the destination information of multiple items to be sorted, that is, determine the sub-area 131 corresponding to the supply station 140 onto which the item to be sorted needs to be guided. After determining the target sub-area of the item to be sorted, the control server 110 may send a guidance command for the item to be sorted to the guiding device 160 according to the determined target sub-area. In some embodiments, the guidance command includes the guidance information that instructs to direct the item to be sorted to the supply station 140 corresponding to the direction of the target sub-area. Optionally, the control server 110 can establish a communication connection with the guiding device 160, and the control server 110 may send the guidance command to the guiding device 160 in a wireless or wired manner.

In an optional mode of the embodiments, referring to FIG. 5, at least one reader 1602 is provided at the entry of the guiding device 160. The reader 1602 communicates with the control server 110 wirelessly, and is configured to scan an information tag on the item to be sorted, read the destination information in the information tag, and send the destination information to the control server 110.

In the embodiments, optionally, at least one reader 1602 is arranged at the entry of the guiding device 160. While, the readers 1602 can be arranged on both sides of the channel to the entry of the guiding device 160, and each reader 1602 among the arranged readers 1602 corresponds to one exit. When determining that the item to be sorted enters the guiding device 160, the reader 1602 scans an information tag on the item to be sorted, reads the destination information in the information tag, and sends the destination information to the control server 110, so as to control the server 110 to perform the subsequent operations according to the obtained destination information. Optionally, the reader 1602 may be a radio frequency (RF) reader, and the information tag may be a RF tag. Optionally, the reader 1602 may be a code scanning camera, and the information tag may be a barcode. After receiving the destination information of the item to be sorted, the control server 110 can determine the target delivery opening corresponding to the item to be sorted, and determine the target sub-area where the target delivery opening is located.

In an optional mode of the embodiments, the guiding process of the item to be sorted in the guiding device 160 may be: the guiding device 160 receives a guidance command sent by the control server 110, guides and conveys the item to be sorted to the supply station 140 in the direction of the target sub-area through the conveying component 1601 according to the guiding information contained in the guidance command, and then guides the item to be sorted to the supply station 140 corresponding to the target sub-area. That way the subsequent sorting robot 120 can retrieve the item to be sorted from the supply station 140 to allow the subsequent sorting and delivery operations to be performed. Optionally, a plurality of supply stations 140 may be deployed in the target sub-area. In order to avoid guiding errors of the guided items to be sorted, each exit of the guiding device 160 corresponds to one supply station 140. That is, the item to be sorted output from a certain exit of the guiding device 160 can only be transferred to the supply station 140 corresponding to this exit, and cannot be transferred to other stations in the target sub-area.

In an optional mode of the embodiments, the exit of the guiding device 160 is at a certain distance from the supply station 140. Therefore, when guiding the item to be sorted, the guiding device 160 can guide the item to be sorted toward the direction corresponding to the target sub-area through the conveying component 1601 according to the guiding command, and guide the item to be sorted to the chute at the preset guiding position of the target sub-area through the conveying component 1601, so as to subsequently transfer the item to be sorted in the chute to the supply station 140 corresponding to the target sub-area.

In the embodiments, an optional example is provided. Considering that there is still a certain distance between the preset guiding position of the target sub-area and the supply station 140 corresponding to the target sub-area, in order to speed up the sorting and delivery efficiency of the item to be sorted, a conveyor can be arranged between the preset guiding position of the target sub-area and the supply station 140 corresponding to the target sub-area. Here the conveyor may dock with the chute. The conveyor can convey the item to be sorted that falls into the chute at the preset guiding position to the supply station 140 of the target sub-area. In the embodiments, the preset guiding position of the target sub-area can be set according to actual conditions. For example, the preset guiding position is in the zone close to edge of the supply station 140 corresponding to the target sub-area.

According to a sorting scheme provided in the embodiments of the present application, the control server can guide the items to be sorted with different destinations respectively to the supply stations corresponding to different sub-areas matching with the items to be sorted with different destinations through the guiding device according to the destination information of the items to be sorted, ensuring that the items to be sorted with different destinations are only allowed to be sorted and delivered at the supply stations corresponding to their respective target sub-areas. Since the size of the floor space of each sub-area is appropriate, multiple items to be sorted only need to be sorted and delivered within a short distance in their respective sub-areas to complete the sorting and delivery process normally. Sorting and delivery across sub-areas and the long-distance sorting and delivery in the entire sorting area is eliminated, thereby reducing the path of the items to be sorted and improving the delivery efficiency.

Figure 6:
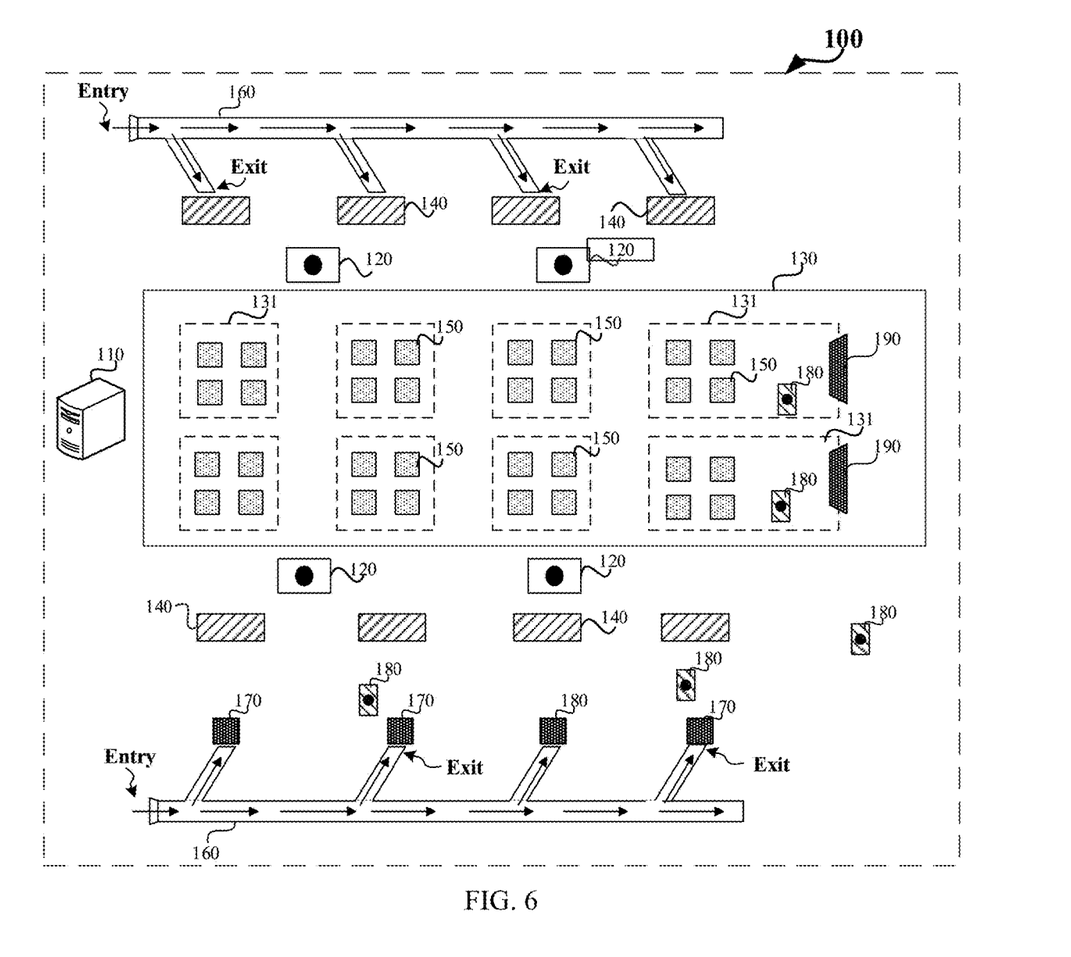
FIG. 6 is a structural schematic diagram of yet another sorting system provided in embodiments of the present application.

FIG. 6 is a structural schematic diagram of yet another sorting system provided in embodiments of the present application. The embodiments are described on the basis of the foregoing embodiments. The embodiments can be combined with multiple optional solutions in one or more of the foregoing embodiments. Referring to FIG. 6, on the basis of the sorting system of the foregoing embodiments, the sorting system provided in the embodiments further includes: an item transfer container 170 and a plurality of container transport robots 180. The item transfer container 170 is provided at an exit of the guiding device 160, and the item transfer container 170 is configured to store the item to be sorted output from the exit of the guiding device 160.

The control server 110 is further configured to, in the case when determining that the item transfer container 170 satisfies a transfer condition, select a target supply station in the target sub-area; and assign a transport task to a target container transport robot 180 among the plurality of container transport robots 180 according to the target supply station; and the target container transport robot 180 is configured to, in response to the transport task, transport the item transfer container at the target exit to the target supply station 140 of the target sub-area 131. The transfer condition is described further below.

In the embodiments, here is still a certain distance between the preset guiding position of the target sub-area and the supply station 140 corresponding to the target sub-area. So, in order to speed up the sorting and delivery efficiency of the item to be sorted, an item transfer container 170 is arranged at the exit of the guiding device 160, and the item transfer container 170 can accommodate the items to be sorted that fall into the chute from the exit of the guiding device 160 and temporarily store the accommodated items to be sorted. In embodiments, the item transfer container 170 may be a movable container, such as a roll container, etc. In the embodiments, the item transfer container 170 may also continue to temporarily store other items to be sorted that are subsequently guided by the guiding device 160 to fall.

In the embodiments, in the case when determining that the item transfer container 170 satisfies the transfer condition, the control server 110 may select the target supply station 140 from the plurality of supply stations 140 of the target sub-area. Meanwhile, the control server 110 can take the target supply station as the end point, take the location of the item transfer container 170 as the start point, plan at least one driving path, and then select a path with the least congestion and shortest length as the transfer path of the item transfer container 170 at this time in combination with the road condition information of the area where multiple driving paths are located. Then, the control server 110 may generate a transfer command for the item transfer container 170 according to the determined transfer path, and send the generated transfer command to the container transport robot 180 between the guiding device 160 and the target supply station. Optionally, the control server 110 may select the container transport robot 180 with the closest distance in the idle state as the target container transport robot according to the distances of a plurality of container transport robots 180 from the target supply station, and send the transfer command to the target container transport robot. As such, the items to be sorted as many as possible can be put into the item transfer container 170 for batch transfer, thereby greatly reducing the number of transfers comparing with individually transfer, improving the sorting efficiency, and reducing the transport distance of the container transport robot, and thus lowering the transportation cost of the container transport robot.

In the embodiments, optionally the aforementioned transfer condition for the item transfer container 170 includes: the item transfer container 170 is full and/or the preset collection time of the item transfer container 170 is reached. In an optional example, the item transfer container 170 has been full, which may mean that the height of items to be sorted stored in the item transfer container 170 have reached the maximum accommodation limit of the item transfer container 170. Here the maximum accommodation limit of the item transfer container 170 has a certain distance from the top of the item transfer container 170 to prevent the items to be sorted stored in the item transfer container 170 from falling out. In another optional example, the preset collection time of the item transfer container 170 may be set according to the characteristics of the items to be sorted (such as the size of such item, the frequency of occurrence of such item, etc.) stored in the item transfer container 170 or may be set manually according to requirements, and the collection time can be adjusted according to actual conditions.

In an optional mode of the embodiments, the control server judges whether the transfer condition is met when the item transfer container collecting the items to be sorted in the following optional ways:

in a first way: if the control server 110 receives a message indicating that the item transfer container 170 has been full sent by the sensor, it determines that the transfer condition is met; and/or in a second way: if the control server 110 detects that the total volume of the items to be sorted in the item transfer container 170 reaches the preset volume threshold or the control server 110 detects that the collection time of the item transfer container 170 reaches the preset collection time of the item transfer container 170, it determines that the transfer condition is met.

In the embodiments, for the first way, the sensor may be installed on the container transport robot 120 and/or near the opening of the item transfer container 170. The probe head of the sensor points to the upper edge of the item transfer container 170 and is set to detect whether the item transfer container 170 is fully filled with the items to be sorted. In response to detecting that the item transfer container 170 is full, the sensor sends the message indicating that the item transfer container 170 has been full to the control server 110. For example, an infrared sensor is installed on the front end of the container transport robot 180 or the edge of the opening of the item transfer container 170. While the infrared sensor installed on the edge of the opening cannot communicate with the control server 110 only depending on the container opening, a wireless communication module is required to be installed on the edge of the opening. The probe head of the infrared sensor points to the item transfer container 170 below the container opening. When detecting that the item transfer container 170 is full, the infrared sensor sends the message indicating that the item transfer container 170 has been full to the control server 110 through the wireless communication module.

In the embodiments, for the second way, the control server 110 can estimate the total volume of the items to be sorted in the item transfer container 170 according to the volume of each item to be sorted that is guided into the item transfer container 170, compare the total volume of the items to be sorted in the item transfer container 170 with the preset volume threshold of the item transfer container, and determine that the transfer condition is met in response to that the total volume of the items to be sorted in the item transfer container 170 is greater than or equal to the preset volume threshold of the item transfer container 170. In addition, the control server 110 can further judge whether the transfer condition is satisfied through the collection time of the item transfer container 170. For example, the control server 110 starts a timer when the item transfer container 170 is placed at the preset position of the guiding device 160, and determines that the transfer condition is met in response to that the preset collection time of the transfer container 170 is reached.

In the embodiments, the container transport robot 180 may have its own intelligent system, and can communicate with the control server 110, receive the transfer commands sent by the control server 110, and execute the corresponding transfer tasks of the items to be sorted according to the received transfer commands. When the container transport robot 180 receives a transfer command sent by the control server 110, the container transport robot 180 can drive to the location of the item transfer container 170 according to the transfer command, and transfer the item transfer container 170 to the target supply station of the target sub-area, to allow the sorting robot 120 to subsequently retrieve the item to be sorted from the supply station 140.

In an optional mode of the embodiments, referring to FIG. 6, if each sub-area is correspondingly deployed with a plurality of supply stations 140; the control server 110 is configured to select a target supply station in the target sub-area by: calculating a total delivery distance of all the items to be sorted in the item transfer container 170 at a respective one of different supply stations of the target sub-area, and selecting the target supply station among the plurality of supply stations 140 of the target sub-area based at least in part on the total delivery distance.

In the embodiments, for each sub-area 131 of the sorting area 130, each sub-area 131 may have a correspondence with a plurality of supply stations 140, and the collection containers corresponding to a plurality of delivery openings 150 in each sub-area 131 are arranged in an array. When determining that the item transfer container 170 meets the transfer condition, the control server 110 may, for each item to be sorted contained in the item transfer container 170, determine the delivery gird 150 corresponding to the collection container that will contain the each item to be sorted. Optionally, the control server 110 may determine a delivery opening of the target sub-area from which a plurality of items to be sorted each is needed to be put into the collection container in the target sub-area, that is, determine the delivery opening corresponding to the collection container that will contain the items to be sorted in the target sub-area, according to the destination information of the plurality of items to be sorted in the item transfer container 160. In the embodiments, referring to FIGS. 5 and 6, the destination information of each item to be sorted contained in the item transfer container 170 may be read by the reader 1602 on the guiding device and sent to the control server 110.

In the embodiments, optionally the total delivery distance is the total walking distance of all sorting robots with each item to be sorted in the item transfer container being transported by a corresponding sorting robot from a same supply station to a corresponding delivery opening. For each item to be sorted contained in the item transfer container, the delivery distance of the sorting robot to carry each item to be sorted from the same supply station to the delivery opening for delivering the item to be sorted is determined, to thereby further obtain the total walking distance of the sorting robot to deliver all items to be sorted from the same supply station. Then, for a plurality of supply stations corresponding to the target sub-area, the total walking distance of the sorting robot for delivery from different supply stations is determined, that is, a plurality of total delivery distances corresponding to different supply stations are obtained.

In the embodiments, after determining the total delivery distances of all the items to be sorted in the item transfer container respectively at different supply stations in the target sub-area, the obtained total delivery distances corresponding to different supply stations are sorted, and the target supply station for the item transfer container is selected from the plurality of supply stations 140 of the target sub-area according to the sorting result. In this way, it can be ensured that the sum of delivery distances when delivering a plurality of items to be sorted at the target supply station is the shortest compared with the sum of the delivery distances when delivering a plurality of items to be sorted at each other supply station, which can greatly reduce the total distance of the delivery path of a plurality of items to be sorted. For example, the supply station with the smallest total delivery distance is selected from the plurality of supply stations of the target sub-area as the target supply station. Optionally, if the workload of the supply station with the smallest total delivery distance is saturated, that is, there are already a large number of items to be sorted waiting for sorting and delivery at the supply station, then the supply station with the second smallest total delivery distance is selected as the target supply station, and so on.

According to a package sorting scheme provided in embodiments of the present application, the items to be sorted as many as possible can be put into the item transfer container for batch transfer, thereby greatly reducing the number of transfers comparing with the individually transfer, improving the sorting efficiency, and reducing the transport distance of the container transport robot, and thus lowering the transportation cost of the container transport robot. Furthermore, the supply station for the items to be sorted to be transferred can be determined according to the sum of delivery distances of a plurality of items to be sorted in the item transfer container when they are delivered from a respective one of different supply stations, thereby shortening the subsequent delivery distance of delivering each item to be sorted from the supply station to the delivery opening, reducing the path of subsequent items to be sorted, improving the delivery efficiency, and thus improving the overall sorting efficiency of items to be sorted.

Referring to FIG. 6, the embodiments are described on the basis of the foregoing embodiments. The embodiments can be combined with multiple optional solutions in one or more of the foregoing embodiments. The sorting system provided in the embodiments further includes at least one collection station 190 on the basis of the sorting system of the foregoing embodiments. In the embodiments, each sub-area 131 in the sorting area 130 is correspondingly deployed with at least one collection station 190. The control server 110 is further configured to select a target collection station in the target sub-area when determining that a collection container corresponding to the target delivery opening satisfies the transport condition; and assign a transport task to another target container transport robot 180 among the plurality of container transport robots 180 according to the target collection station; and the target container transport robot 180 is further configured to, in response to the transport task, transport the collection container to the target collection station.

In the embodiments, the sorting area 130 is logically divided into a plurality of sub-areas 131, each sub-area 131 is deployed with a plurality of delivery openings 150, and each delivery opening 150 is correspondingly deployed with a collection container, where a plurality of collection containers are arranged in an array. Optionally, the longitudinal channel and the lateral channel formed in the collection container array may be traveling channels of the container transport robots 180. The relationship between delivery openings 150 and collection containers as well as the role of the longitudinal channel and the lateral channel formed in the collection container array need to be determined based on the actual sorting scenarios (for example, including floor-type sorting scenario and steel platform sorting scenario).

In the embodiments, the above transport condition for the collection container includes: the collection container has been full and/or the preset collection time of the collection container is reached. In an optional example, the collection container has been full, which may mean that the occupation room of the items to be sorted stored in the collection container have reached the maximum accommodation limit of the collection container. In another optional example, the preset collection time of the collection container can be set according to the characteristics of the items to be sorted stored in the collection container or can be manually set according to requirements, and the preset collection time can be adjusted based on actual conditions. It can be understood that the specific way for the control server to judge whether the collection container satisfies the transport condition can refer to the aforementioned way for the control server to judge whether the item transfer container satisfies the transfer condition, which will not be repeated here.

In the embodiments, after receiving the information indicating that the collection container has been full, the control server 110 can control the collection container to be locked and forbid the sorting robots 120 to deliver the items to be sorted into the collection container through the delivery openings 150. Considering that the target sub-area may have a correspondence with a plurality of collection stations 190, that is, each sub-area 131 is correspondingly deployed with a plurality of collection stations 190, the control server 110 is configured to select a target collection station in the target sub-area by: calculating the total transport distance of the collection containers being transported to a respective one of different collection stations 190 of the target sub-area, and selecting the target collection station among the plurality of collection stations 190 of the target sub-area based at least in part on the total transport distance. Then, the control server 110 can assign a transport task to another target container transport robot among the plurality of container transport robots 180 according to the target collection station. The target container transport robot can receive the transport task sent by the control server 110, and move the collection container that has met the transport condition to the collection station 190 in response to the received transport task, so as to perform the package collection on the items to be sorted in the collection container at the collection station 190.

Figure 7:
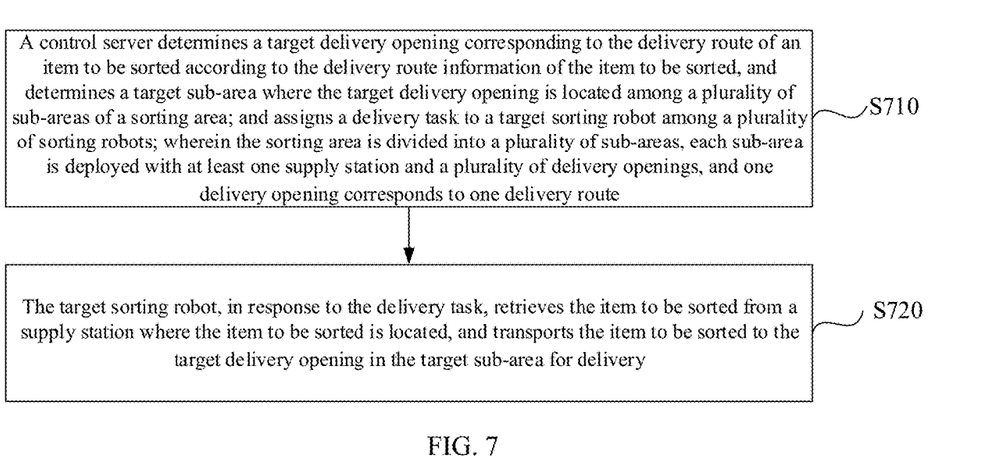
FIG. 7 is a flowchart of a sorting method provided in embodiments of the present application.

FIG. 7 is a flowchart of a sorting method provided in embodiments of the present application. The technical solution of the embodiments can be applied to the case of sorting packages in multiple sorting scenarios. This method is applied to the sorting system provided in any embodiment of the present application. As shown in FIG. 7, the sorting method provided in the embodiments of the present application includes the following steps.

S710: a control server determines a target delivery opening corresponding to the destination of an item to be sorted according to the destination information of the item to be sorted, and determines a target sub-area where the target delivery opening is located among a plurality of sub-areas of a sorting area; and assigns a delivery task to a target sorting robot among a plurality of sorting robots; wherein the sorting area is divided into a plurality of sub-areas, each sub-area is deployed with at least one supply station and a plurality of delivery openings, and one delivery opening corresponds to one destination.

Based on the foregoing embodiment, the delivery openings among the plurality of sub-areas may have the same destination.

Based on the foregoing embodiments, the physical locations of destinations corresponding to a plurality of delivery openings in at least one sub-area may be close.

In one embodiment, the case that the physical locations of destinations corresponding to a plurality of delivery openings in at least one sub-area are close can be understood as: the distance between physical locations of destinations corresponding to any two of a plurality of delivery openings in at least one sub-area is less than a preset distance threshold.

Based on the foregoing embodiments, the control server may assign the delivery task to a target sorting robot among the plurality of sorting robots, including: in the case that each sub-area corresponds respectively to a different sorting robot among the plurality of sorting robots and corresponds to at least one sorting robot, assigning the delivery task to a target sorting robot among at least one sorting robot corresponding to the target sub-area according to the target sub-area.

Based on the foregoing embodiments, the method may further include: the control server sends a guidance command of the item to be sorted to a guiding device according to the target sub-area; wherein the guiding device includes an entry, a plurality of exits, and a conveying component connecting the entry and the plurality of exits; the item to be sorted enters the guiding device through the entry, and is conveyed through the conveying component, and exits from the guiding device through one of the plurality of exits; and there is a preset correspondence between the plurality of exits and the plurality of supply stations; the guiding device guides the item to be sorted to a target exit corresponding to one supply station in the target sub-area according to the guidance command.

Based on the foregoing embodiments, optionally the method may further include: a reader scans an information tag on the item to be sorted, reads the destination information in the information tag, and sends the destination information to the control server; wherein the reader is arranged at the entry of the guiding device, and the reader is configured to communicate with the control server wirelessly.

Based on the foregoing embodiments, one exit may correspond to one supply station.

Based on the foregoing embodiments, the method may further include: an item transfer container receives the item to be sorted output from an exit of the guiding device; wherein the item transfer container is arranged at the exit of the guiding device.

Based on the foregoing embodiments, the method may further include: in the case determining that the item transfer container satisfies a transfer condition, the control server selects a target supply station in the target sub-area; and assigns a transport task to a target container transport robot among the plurality of container transport robots according to the target supply station; the target container transport robot, in response to the transport task, transports the item transfer container at the target exit to the target supply station of the target sub-area.

Based on the foregoing embodiments, the control server may select a target supply station in the target sub-area, including: in the case when a plurality of supply stations are deployed in each sub-area, calculating a total delivery distance of all items to be sorted in the item transfer container corresponding to a respective one of different supply stations of the target sub-area, and selecting the target supply station among the plurality of supply stations of the target sub-area based at least in part on the total delivery distance; wherein the total delivery distance is a total walking distance of all sorting robots with each item to be sorted in the item transfer container being delivered by a corresponding sorting robot from a same supply station to a corresponding delivery opening.

Based on the foregoing embodiments, the control server may determine the target delivery opening corresponding to the destination of the item to be sorted according to the destination information of the item to be sorted, including: matching the destination information of the item to be sorted with pre-stored delivery opening configuration information of a plurality of destinations; and determining the target delivery opening corresponding to the destination of the item to be sorted among the plurality of delivery openings according to a matching result; wherein the control server stores the delivery opening configuration information of the plurality of destinations, and each destination in the delivery opening configuration information is associated with at least one delivery opening.

S720: the target sorting robot, in response to the delivery task, retrieves the item to be sorted from a supply station where the item to be sorted is located, and transports the item to be sorted to the target delivery opening in the target sub-area for delivery.

Based on the foregoing embodiments, when at least one collection station is further deployed in each sub-area, the control server may select a target collection station in the target sub-area when determining that a collection container corresponding to the target delivery opening satisfies a transport condition; the control server assigns a transport task to another target container transport robot among the plurality of container transport robots according to the target collection station; and the target container transport robot, in response to the transport task, transports the collection container to the target collection station.

Based on the foregoing embodiments, the control server may select a target collection station in the target sub-area, including: in the case when a plurality of collection stations are deployed in each sub-area, calculating a total transport distance of the collection containers being transported to a respective one of different collection stations of the target sub-area, and selecting the target collection station among the plurality of collection stations of the target sub-area based at least in part on the total transport distance.

The sorting method provided in embodiments of the present application can be applied to the sorting system provided in any embodiment of the present application, and has the corresponding functions of the sorting system. The technical details not described in the above embodiments can refer to the sorting system provided in any embodiment of the present application.

In the description of this specification, the description with reference to the terms "one embodiment", "some embodiments", "example", "specific example" or "some examples" etc. means that specific features, structure, materials or characteristics described in conjunction with the embodiment or example are included in at least one embodiment or example of the present application. In this specification, the schematic representations of the above terms do not necessarily refer to the same embodiment or example. Moreover, the specific features, structures, materials or characteristics described may be combined in a suitable manner in any one or more embodiments or examples.

What is claimed is:

1. A sorting system comprising:
a control server;
a plurality of sorting robots and a sorting area;
a guiding device; and
an item transfer container at an exit of the guiding device;
wherein the sorting area is divided into a plurality of sub-areas, each sub-area is deployed with a plurality of supply stations and a plurality of delivery openings, and one delivery opening corresponds to one destination;
wherein, the control server is configured to:
  determine a target delivery opening corresponding to a destination of an item to be sorted according to destination information of the item to be sorted;
  determine a target sub-area where the target delivery opening is located among the plurality of sub-areas of the sorting area;
  select a target supply station in the target sub-area by calculating a total delivery distance of all items to be sorted in the item transfer container corresponding to a respective one of different supply stations of the target sub-area; and selecting the target supply station of the plurality of supply stations of the target sub-area based at least in part on the total delivery distance; and
  assign a delivery task to a target sorting robot among the plurality of sorting robots;
the target sorting robot is configured to:
  after the item to be sorted is transported to a supply station in the target sub-area, in response to the delivery task, retrieve the item to be sorted from the supply station where the item to be sorted is located;
  transport the item to be sorted to the target delivery opening in the target sub-area for delivery;
  wherein the total delivery distance is a total walking distance of each sorting robot while delivering each item in the item transfer container from the supply station to a corresponding delivery opening.

2. The system according to claim 1, wherein a plurality of the delivery openings have a same destination; or
wherein physical locations of destinations corresponding to any two of a plurality of delivery openings in at least one sub-area are close.

3. The system according to claim 1, wherein each sub-area corresponds respectively to a different sorting robot among the plurality of sorting robots, and corresponds to at least one sorting robot;
the control server is configured to assign a delivery task to a target sorting robot among the plurality of sorting robots by:
  assigning the delivery task to a target sorting robot among at least one sorting robot corresponding to the target sub-area, according to the target sub-area.

4. The system according to claim 1, further comprising:
the guiding device comprising an entry, a plurality of exits, and a conveying component connecting the entry and the plurality of exits; wherein
the item to be sorted enters the guiding device through the entry, and is conveyed through the conveying component, and exits from the guiding device through one of the plurality of exits; and
a preset correspondence between the plurality of exits and a plurality of supply stations is provided;
wherein:
the control server is further configured to send a guidance command of the item to be sorted to the guiding device according to the target sub-area;
the guiding device is configured to guide the item to be sorted to a target exit corresponding to a supply station in the target sub-area according to the guidance command.

5. The system according to claim 4, further comprising:
at least one reader at the entry of the guiding device; wherein
the reader is configured to communicate with the control server wirelessly; and
the reader is further configured to scan an information tag on the item to be sorted, read destination information in the information tag, and send the destination information to the control server.

6. The system according to claim 4, further comprising:
the item transfer container at an exit of the guiding device
is configured to receive the item to be sorted output from the exit of the guiding device.

7. The system according to claim 6, further comprising: a plurality of container transport robots; wherein:
the control server is further configured to:
select a target supply station in the target sub-area when determining that the item transfer container satisfies a transfer condition; and
assign a transport task to a target container transport robot among the plurality of container transport robots according to the target supply station;
the target container transport robot is configured to, in response to the transport task, transport the item transfer container at the target exit to the target supply station of the target sub-area.

8. The system according to claim 1, wherein the control server stores delivery opening configuration information of a plurality of destinations, and each destination in the delivery opening configuration information is associated with at least one delivery opening;
the control server is configured to determine the target delivery opening corresponding to the destination of the item to be sorted according to the destination information of the item to be sorted by:
matching the destination information of the item to be sorted with the pre-stored delivery opening configuration information of the plurality of destinations; and
determining the target delivery opening corresponding to the destination of the item to be sorted among the plurality of delivery openings according to a matching result.

9. The system according to claim 7, wherein at least one collection station is deployed in each sub-area;
the control server is further configured to:
select a target collection station in the target sub-area when determining that a collection container corresponding to the target delivery opening satisfies a transport condition; and
assign a transport task to another target container transport robot among the plurality of container transport robots according to the target collection station; and
another target container transport robot is configured to, in response to the transport task, transport the collection container corresponding to the target delivery opening to the target collection station.

10. A sorting method, comprising:
a control server determining a target delivery opening corresponding to a destination of an item to be sorted according to destination information of the item to be sorted, and determining a target sub-area where the target delivery opening is located among a plurality of sub-areas of a sorting area; and assigning a delivery task to a target sorting robot among a plurality of sorting robots;
wherein the sorting area is divided into a plurality of sub-areas, each sub-area is deployed with a plurality of supply stations and a plurality of delivery openings, and one delivery opening corresponds to one destination;
calculating a total delivery distance of all items to be sorted in an item transfer container corresponding to a respective one of the different supply stations of the target sub-area, and selecting the target supply station among the plurality of supply stations of the target sub-area based at least in part on the total delivery distance; and
after the item to be sorted being transported to a supply station in the target sub-area, the target sorting robot, in response to the delivery task, retrieving the item to be sorted from the supply station where the item to be sorted is located, and transporting the item to be sorted to the target delivery opening in the target sub-area for delivery;
wherein the total delivery distance is a total walking distance of each sorting robot while delivering each item in the item transfer container from the supply station to a corresponding delivery opening.

11. The method according to claim 10, wherein when the control server assigns the delivery task to a target sorting robot among the plurality of sorting robots, the method further comprising:
when each sub-area corresponds respectively to a different sorting robot among the plurality of sorting robots and corresponds to at least one sorting robot, assigning the delivery task to a target sorting robot among at least one sorting robot corresponding to the target sub-area according to the target sub-area.

12. The method according to claim 10, further comprising:
the control server sending a guidance command of the item to be sorted to a guiding device according to the target sub-area;
wherein the guiding device comprises an entry, a plurality of exits, and a conveying component connecting the entry and the plurality of exits; the item to be sorted enters the guiding device through the entry, and is conveyed through the conveying component, and exits from the guiding device through one of the plurality of exits; and a preset correspondence between the plurality of exits and the plurality of supply stations is provided;

the guiding device guiding the item to be sorted to a target exit corresponding to a supply station in the target sub-area according to the guidance command.

13. The method according to claim 12, further comprising:

a reader scanning an information tag on the item to be sorted, reading destination information in the information tag, and sending the destination information to the control server;

wherein the reader is arranged at the entry of the guiding device, and the reader is configured to communicate with the control server wirelessly.

14. The method according to claim 12, further comprising:

the item transfer container receiving the item to be sorted output from an exit of the guiding device;

wherein the item transfer container is arranged at the exit of the guiding device;

wherein when the item transfer container satisfies a transfer condition:

the control server selecting a target supply station in the target sub-area; and assigns a transport task to a target container transport robot among the plurality of container transport robots according to the target supply station; and the target container transport robot, in response to the transport task, transports the item transfer container at the target exit to the target supply station of the target sub-area.

15. The method according to claim 14, further comprising:

when at least one collection station is further deployed in each sub-area, the control server selects a target collection station in the target sub-area when determining that a collection container corresponding to the target delivery opening satisfies a transport condition;

the control server assigns a transport task to another target container transport robot among the plurality of container transport robots according to the target collection station; and another target container transport robot, in response to the transport task, transports the collection container to the target collection station.

16. The method according to claim 15, wherein the control server selecting a target collection station in the target sub-area, comprises:

in a case that a plurality of collection stations are deployed in each sub-area, calculating a total transport distance of the collection containers being transported to a respective one of different collection stations of the target sub-area; and selecting the target collection station among the plurality of collection stations of the target sub-area based at least in part on the total transport distance.

17. The method according to claim 10, wherein when the control server determines the target delivery opening corresponding to the destination of the item to be sorted according to the destination information of the item to be sorted, the method further comprises:

matching the destination information of the item to be sorted with pre-stored delivery opening configuration information of a plurality of destinations;

determining the target delivery opening corresponding to the destination of the item to be sorted among the plurality of delivery openings according to a matching result;

wherein the control server stores the delivery opening configuration information of the plurality of destinations, and each destination in the delivery opening configuration information is associated with at least one delivery opening.

* * * * *